Sept. 4, 1934.  J. J. LOW  1,972,348

SIX-WHEEL ATTACHMENT

Filed April 1, 1929

Inventor
John Judson Low
By Lyon & Lyon
Attorneys

Patented Sept. 4, 1934

1,972,348

UNITED STATES PATENT OFFICE 1,972,348

SIX-WHEEL ATTACHMENT

John Judson Low, Los Angeles, Calif., assignor to Six Wheel Corporation, Los Angeles, Calif., a corporation of California.

Application April 1, 1929, Serial No. 351,578

13 Claims. (Cl. 280—124)

This invention relates to six wheel attachments, and more particularly to the running gears of motor vehicles or the like of the six wheel type where two added wheels are added by means of an attachment so that the load carried by the motor vehicle is distributed between the four rear wheels, that is, the two drive wheels and the two attachment wheels that was normally carried by the drive wheels.

An object of this invention is to provide a simple and inexpensive form of attachment for use in changing or converting a four-wheel running gear to a six-wheel running gear of light trucks of the 1, 1½ or 2-ton varieties so that such light trucks may be used for the carrying of from 3 to 4-tons load.

Another object of this invention is to provide a six-wheel attachment for motor vehicles which is of inexpensive construction requiring the use of only a single supporting spring which is operatively secured at its opposed ends to the drive and attachment wheels on each side of the running gear and serves as a lever through which the load distribution between the wheels on each side of the truck is accomplished, and a means of inexpensive construction of attaching the attachment wheels to the running gear of a truck to permit the attachment wheels on the opposed sides of the truck operating independently of each other to effect proper load distribution to such wheels irrespective of the road conditions.

Other objects and advantages of this invention it is believed will be apparent from the following detailed description of a preferred embodiment thereof as illustrated in the accompanying drawing:

Figure 1:
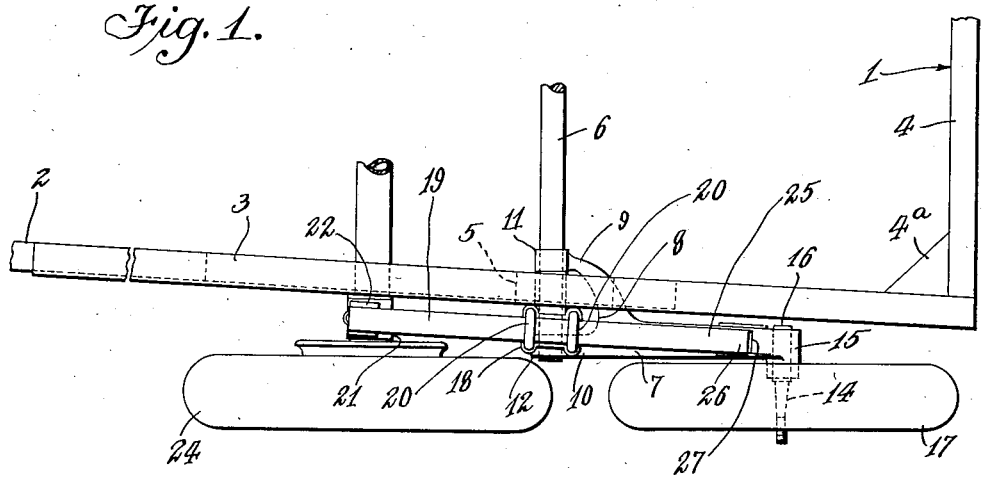
Figure 1 is a top plan view of a six-wheel attachment as installed upon the running gear of a truck and as embodying this invention illustrating only a rear fragment of the rear portion of the frame of such truck.
Figure 2:
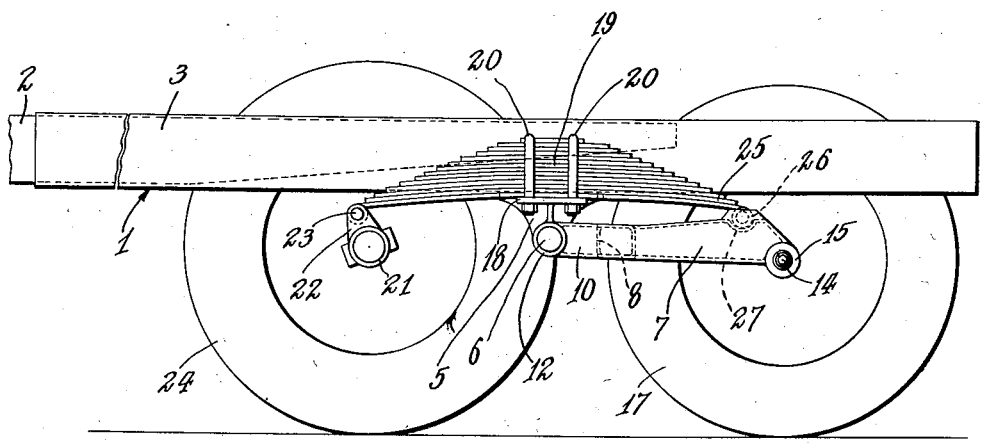
Figure 2 is a side elevation thereof.

In the preferred embodiment of this invention illustrated in the accompanying drawing, 1 indicates a frame which is herein illustrated as being composed of spaced frame members 2 which have been spliced by the addition of frame members 3 to elongate the frame to permit the structure being changed from a four-wheel running gear to a six-wheel running gear and carry the additional load which is distributed between the added wheels and the original wheel of the four-wheel running gear.

The frame members 3 are connected together at their rear ends by means of transverse frame member 4 and by brace plates 4ª. Secured to the frame members 3 on opposed sides of the frame are brackets 5. The brackets 5 are securely held in position and are tied together by means of a tie rod 6 which extends through bosses formed in the lower extensions of the brackets 5 and is secured in position therein and the ends of the rod 6 extend beyond the brackets 5. Journaled on the ends of the tie rod 6 are arms 7. The arms 7 are forked as illustrated at 8 to form two spaced bearing arms 9 and 10, which are provided at their ends with bearing bosses 11 and 12 through which the rod 6 is extended, and by which the arms 7 are journaled on the rod 6 on opposed sides of the brackets 5. By this construction the arms 7 are held in position and journaled upon the rod 6 and are held against longitudinal movement along the rod 6.

The rod 6 is secured in position by any suitable or desirable means such, for example, as sweating the rod 6 in position in the brackets 5. In assembling the structure thus produced, the brackets 5 are first secured to the frame and the rod 6 is threaded through the bearing bosses 11 and 12 of the arms 7 and through the bosses of the bracket 5.

The arms 7 extend from the brackets 5 and carry at their loose ends spindles 14 which are releasibly held in position in the cylindrical portions 15 formed at the ends of said arms. The spindles 14 are press-fitted through the bore formed through the cylindrical portions 15 of the arms 7 and are provided with a head 16 which engages the inner end of the said portions 15. When the wheels 17 are journaled on the spindles 14 and locked in position thereon by any suitable or desirable means, the spindles 14 are prevented from becoming displaced from their position in relation to the arms 7. The wheels 17 may be secured in position on the spindles 14 in any suitable or desirable manner to permit the same to freely rotate thereon and any suitable or desirable form of bearing means may be provided.

Mounted upon a saddle or plate 18 formed at the upper end of the brackets 35 is a spring 19. The spring 19 is a multiple leaf spring such as is customarily used for securing wheels to the running gear of a motor vehicle. The spring 19 is secured to the plate 18 by means of U-bolts 20.

One end of each spring 19 is secured to the axle housing 21 by means of a spring shackle 22. The spring shackle 22 is journaled on the axle housing 21 at one end and is pivotally secured by means of a pin 23 passing through an eye formed in the end of the spring 19 at its opposite end. This manner of pivotal attachment of the spring 19 with the axle housing 21 permits elongation of the spring 19 as its curvature is decreased by the load without imposing a strain upon the axle housing 21. In this manner the drive wheels 24 of the running gear are supported by the spring 19. The springs 19 at their opposite ends are operatively connected with the arms 7 so that the springs 19 themselves serve as a lever for distributing the load or proportioning the load between the drive wheels 24 and the attachment wheels 17. In order to permit flexibility of operation of the attachment wheels, it is preferable that the ends 25 of the springs 19 be operatively connected with the arms 7 by having the rolled ends 26 thereof fit within pockets 27 formed in the upper surface of the arms 7 loosely. The pockets 27 are elongated slightly to permit elongation of these portions of the springs 19 without resistance from a connection between the ends of the springs 19 and the arms 7.

Having fully described by invention, it is to be understood that I do not wish to be limited to the details herein set forth, but my invention is of the full scope of the appended claims.

I claim:

1. In a running gear, the combination of a frame, brackets secured on opposed sides of the frame, a rod connecting said brackets, springs secured intermediate their ends to said brackets, means for pivotally securing one pair of ends of said springs to the axle or axle housing supporting the driving wheels, lever arms pivotally secured on the opposed ends of said rod, stub spindles formed at the ends of said lever arms, attachment wheels journaled on said spindles, and means for operatively engaging the free ends of said springs with the said levers to distribute part of the load carried by said frame to the attachment wheels.

2. In a running gear, the combination of a frame, brackets secured on opposed sides of the frame, a rod connecting said brackets, springs secured intermediate their ends to said brackets, driving wheels, means for pivotally securing one end of each spring to the driving wheels, lever arms having a forked construction at one end, means for pivotally securing the tines of the forked construction on said rod on opposite sides of said brackets, stub spindles formed at the opposite ends of said lever arms, attachment wheels journaled on said spindles, and means for operatively engaging the free ends of said springs with said levers.

3. In a running gear, the combination of a frame, brackets secured on opposed sides of the frame, a rod connecting said brackets, springs, means to secure the springs intermediate their ends to the brackets, means for pivotally securing one pair of ends of said springs to the axle or axle housing supporting the driving wheels, lever arms pivotally secured on the opposed ends of said rod, stub spindles formed at the ends of said lever arms, attachment wheels journaled on said spindles, and means for operatively engaging the free ends of said springs with the said levers to distribute part of the load carried by said frame to the attachment wheels.

4. In a running gear, the combination of a frame, brackets secured on opposed sides of the frame, a rod connecting said brackets, springs, means to secure the springs intermediate their ends to said brackets, driving wheels, means for pivotally securing one end of each spring to the driving wheels, lever arms having a forked construction at one end, means for pivotally securing the tines of the forked construction on said rod on opposite sides of said brackets, stub spindles formed at the opposite ends of said lever arms, attachment wheels journaled on said spindles, and means for operatively engaging the free ends of said springs with said levers.

5. In a vehicle, the combination of spring rockers disposed on opposite sides of the vehicle frame, means independently mounting said rockers intermediate their ends on said frame, a ground wheel axle connecting corresponding ends of said rockers and attached thereto, the other ends of said rockers being free of one another, radius levers for each of said rockers pivotally mounted on said means, each of said radius levers extending along one of the arms of a rocker opposite to said axle, each of said rockers being supported at its end opposite to said axle on a radius lever to enable flexing movement of said springs, and ground wheels journalled on the free ends of said radius levers.

6. In a vehicle, the combination of leaf springs disposed on opposite sides of the vehicle frame, means independently mounting said springs intermediate their ends on said frame, a ground wheel axle connecting corresponding ends of said springs and attached thereto, the other ends of said rockers being free of one another, radius levers for each of said springs pivotally mounted on said means, each of said levers being spaced from and extending along the length of one arm of said spring, each of said radius levers having a seat for its spring at the free end of the lever to enable longitudinal movement due to flexing of said springs, and ground wheels journalled to the free ends of said levers.

7. A multi-wheel road vehicle comprising a frame, two pairs of transversely aligned wheels supporting one end of said frame, one pair of said wheels supporting a drive axle, means for connecting the other pair of wheels to said frame for swinging movement about an axis extending transversely of the frame and disposed between the wheels on the same side of said frame, each of said last named wheels being movable independently of the wheel at the other side, and resilient means to yieldingly resist the movement of all of the wheels with respect to the frame, comprising a beam for each side of said frame, opposite ends of each of said beams being attached to said drive axle and to the non-driven wheel at that side of the frame respectively.

8. The combination defined in claim 7 in which said beams are pivotally connected to said frame for swinging movement about an axis that is approximately coincident with the first named axis.

9. A multi-wheel road vehicle comprising a frame, a trunnion shaft extending transversely of said frame, a pair of longitudinal beams pivoted between their ends for swinging movement about said trunnion shaft, a drive axle supported by a pair of wheels, said axle being designed to support one end of each of said beams, a pair of arms pivotally connected at one end to said trunnion shaft and extending away from said drive axle and being each at its free end projecting towards an end of one of said beams to support the same, and a non-driven wheel supporting said free projecting end of each of said arms.

10. The combination defined in claim 9 in which the connection between the beam end and each of said arms is at a point spaced endwise of said arm from said wheel supported thereby.

11. A multi-wheel road vehicle comprising a frame, a trunnion shaft extending transversely of said frame, a spring mounted for pivotal movement on said shaft at each side of said frame, a drive axle extending transversely of said frame and supporting one end of each of said springs, a pair of drive wheels supporting said axle, an arm at each side of said frame journalled on said shaft adjacent one end and extending away from said axle, a stub axle carried by each arm, a non-driven wheel on each of the stub axles, and means connecting the other end of each of said springs to one of said arms.

12. The combination defined in claim 11 in which said last named means is attached to said arms at a point spaced from the stub axles carried thereby.

13. In a vehicle running gear, the combination of a frame, brackets secured on opposed sides of the frame, springs, means to secure the springs to the brackets, two sets of transversely aligned wheels, at least one set of which is driven, disposed in tandem adjacent said springs, means for positioning said one set of driven wheels to cause the latter to support one end of each of said springs, inextensible lever arms pivoted on opposed sides of the frame, means for rotatably mounting the other set of wheels on the free ends of said lever arms in a manner to permit each lever arm and its supporting wheel to swing through a predetermined path relative to the frame without undesirable interference from the other lever arm and its supporting wheel, and the other ends of said springs being in sliding engagement with portions of said lever arms to yieldingly resist upward oscillation of the latter.

JOHN JUDSON LOW.